United States Patent [19]
Ross

[11] Patent Number: 5,720,157
[45] Date of Patent: Feb. 24, 1998

[54] AUTOMATIC ORDER SELECTION SYSTEM AND METHOD OF OPERATING

[75] Inventor: Phillip N. Ross, Hellertown, Pa.

[73] Assignee: SI Handling Systems, Inc., Easton, Pa.

[21] Appl. No.: 625,570

[22] Filed: Mar. 28, 1996

[51] Int. Cl.$^6$ .................................................. B65B 35/30
[52] U.S. Cl. ........................... 53/445; 53/168; 53/202; 53/154; 53/237; 53/474; 198/349; 414/273; 364/478.04; 364/478.11
[58] Field of Search .................... 53/154, 168, 202, 53/237, 445, 474; 198/437, 439, 349, 349.5, 349.6, 349.7; 221/10, 11, 12, 124, 129; 414/268, 273; 364/478.04, 478.07, 478.11, 478.12, 478.14, 478.17, 478.18, 479.01, 479.11, 479.12

[56] References Cited

U.S. PATENT DOCUMENTS

| | | | |
|---|---|---|---|
| 3,011,621 | 12/1961 | Byrnes et al. | 198/349 |
| 3,731,782 | 5/1973 | Del Rosso | 198/439 |
| 4,181,947 | 1/1980 | Krauss et al. | 364/478.11 |
| 4,385,859 | 5/1983 | Goossens | 414/268 X |
| 4,501,528 | 2/1985 | Knapp . | |
| 4,527,937 | 7/1985 | Tomasello | 414/273 |
| 4,542,808 | 9/1985 | Lloyd et al. | 364/478.04 X |
| 4,656,591 | 4/1987 | Goldberg | 364/478.04 |
| 4,672,553 | 6/1987 | Goldberg | 364/478.04 |
| 4,835,702 | 5/1989 | Tanaka | 364/478.11 X |
| 5,018,073 | 5/1991 | Goldberg | 364/478.12 |
| 5,220,511 | 6/1993 | Speckhart et al. | 364/478.11 |
| 5,230,205 | 7/1993 | Christ | 53/168 X |
| 5,271,703 | 12/1993 | Lindqvist et al. . | |
| 5,322,406 | 6/1994 | Pippin et al. | 221/129 X |
| 5,363,310 | 11/1994 | Haj-Ali-Ahmadi et al. | 364/478.04 |
| 5,454,688 | 10/1995 | Pippin | 414/273 X |

Primary Examiner—Daniel Moon
Attorney, Agent, or Firm—Seidel Gonda Lavorgna & Monaco, PC

[57] ABSTRACT

An order selection system is disclosed together with a method of operating the system for retrieving multiple types of items stored in preselected storage locations and delivering retrieved items in an orderly sequence to a plurality of packing stations in accordance with the specific requirements of different orders. The order selection system comprises: a dispenser; a conveyor; a dispensing control system; a sorter; a plurality of stacking devices; and identifying means to identify the end of each order. The steps in the method of operating the system are: arranging the multiple types of items in the preselected storage locations; determining the requirements of orders to be filled; dispensing the items stored in the preselected storage locations in an alternating order sequence in accordance with the requirements of sequential orders; receiving the dispensed items on the conveyor in the alternating order sequence; transporting the dispensed items on the conveyor toward the packing stations; sorting the items so as to divert every other item toward separate packing stations; stacking the sorted items into discrete continuous stacks conforming with the specific requirements of the orders; and identifying the end of each order.

20 Claims, 5 Drawing Sheets

AUTOMATIC ORDER SELECTION SYSTEM AND METHOD OF OPERATING

FIELD OF THE INVENTION

The invention pertains to automated material handling and order picking systems, and more particularly, to an order selection system and a method of operating the system for retrieving multiple types of items stored in preselected storage locations and delivering retrieved items in an orderly sequence to a plurality of packing stations in accordance with the specific requirements of different orders.

BACKGROUND OF THE INVENTION

Order picking is the selective retrieval of appropriate numbers and types of products from a storage area to fill specific customer orders. Orders are usually represented by a list of stock keeping units (SKUs) or line items. The list specifies the type and quantity of each unit or item to be retrieved, along with other information such as the storage location, the scheduled picking period, the due date, the customer name and address, etc. Thus, an order picking system typically consists of physical subsystems including personnel and/or mechanical equipment required to select, retrieve, transport, check, pack, and ship, plus data processing subsystems that provide the information required to operate the physical subsystems.

Order picking or order selection systems often are part of the material handling systems within warehouses. The storage and retrieval capabilities of such material handling systems must keep up with demand for the ever-increasing variety of products being made available to consumers. This increasing demand is being encountered for products such as pharmaceutical products; cosmetics; health and beauty aids; contact lenses; photographic films; automotive equipment; compact discs; audio and video cassettes; books; and many other consumer products. This ever-increasing demand creates a need to improve the storage and retrieval capabilities of the warehouses that stock these commodities.

To meet these ever-increasing demands, warehouse material handling systems have been automated and, more particularly, are controlled by various computerized systems, one of which is disclosed in U.S. Pat. No. 4,501,528 (Knapp). The Knapp system has shelves serving as storage locations within storage magazines to which the shelves are attached and in which are stored products in a stacked arrangement. Each of the storage locations has an assigned ejector, responsive to commands initiated by a computer, for retrieving the stacked products. The retrieved products are directed onto a conveyor or gathering belt, which transports retrieved products to a central station for collection.

Another automated system is disclosed in U.S. Pat. No. 5,271,703 (Lindqvist, et al. ). This order selection system responds to requests from an external device such as a computer that specifies the products to be retrieved from storage locations. The system retrieves products stored in preselected storage locations of storage modules placed in a warehouse, and delivers the retrieved products to a central gathering station by means of one of more conveyors. The system controller has electronic circuitry, such as a microprocessor with preprogrammed routines, which is responsive to a selected order request, issued by an external device such as a computer, that includes a specified quantity of each product making up the order. The system controller assigns a space on the conveyor to each product included within the selected order request.

Products retrieved by computerized order selection systems need to be assembled in an efficient and orderly fashion to meet shipping requirements accurately and timely. Accurate and efficient order picking very often is crucial to being competitive in the market place.

Mixed quantity orders and uneven order sizes frequently cause problems for order pickers. In the past, a solution has been to provide long packing lines. However, this results in higher operating costs and greater space requirements.

It is desired to have a system and a method of operation that provide for high-speed order fulfillment, while minimizing the space requirements and operating costs of the system. To accomplish this, it is desirable to minimize the number of packing stations and to provide packing personnel with a steady stream of orders at a relatively constant rate.

Downstream operations of existing systems often are inefficient because packing lines are either overloaded or starved due to varying order sizes. Some of these systems have excessively large buffer areas to smooth out the flow of products to the packing stations.

It is desired to have a balanced supply of items to downstream operations so as to eliminate inefficiencies that may result from a packing line being overloaded or starved. Advantages of balanced loading include:

1. Downstream operations receive product at a constant rate;

2. No pacing or metering is necessary to balance downstream operations, so that the system can run at maximum throughput; and 3. Reduced cost and maximum productivity are achieved since downstream operations will receive a constant rate of delivery, and minimal accumulation/buffer areas are required.

SUMMARY OF THE INVENTION

The present invention is an order selection system and a method of operating the system for retrieving multiple types of items stored in preselected storage locations and delivering retrieved items in an orderly sequence to a plurality of packing stations in accordance with the specific requirements of different orders. The order selection system comprises: a dispenser; a conveyor; a dispensing control system; a sorter; a plurality of stacking devices; and identifying means to identify the end of each order. The system may also comprise monitoring means to monitor the inventory of the items stored in the preselected storage locations and replenishing means to replenish those items.

The dispenser, which is arranged to engage the items stored in the preselected storage locations, selectively dispenses the items, which are received onto the conveyor. The dispensed items are then transported toward the packing stations on the conveyor.

A dispensing control system (DCS) controls the dispenser to selectively dispense desired items from the storage locations in a fashion such that the items are dispensed onto the conveyor in a rotating sequence in accordance with the requirements of a designated number of sequential orders being picked or selected concurrently. "Rotating sequence" is defined below.

The sorter is disposed between the conveyor and the packing stations. It sorts the items being transported toward the packing stations in accordance with the requirements of the orders.

A plurality of stacking devices are disposed between the sorter and the packing stations. These stack the sorted items into discrete continuous stacks conforming with the specific requirements of the orders. The end of each order can be identified in a variety of ways. One way is to use a brightly colored puck.

The first step in the method of operating the order selection system is to arrange the multiple types of items in the preselected storage locations. The requirements of the orders to be filled are then determined. To fill the orders, the items stored in the preselected storage locations are dispensed in a rotating sequence in accordance with the requirements of a preselected number of orders. The dispensed items are received on the conveyor in a sequential order in accordance with the requirements of the preselected sequential orders, and the dispensed items are transported on the conveyor toward the packing stations.

Sorting of the items being transported is performed by the sorter, which diverts each of the items toward a specific one of a plurality of packing stations in accordance with the requirements of the orders. The sorted items are stacked into discrete continuous stacks conforming with the specific requirements of the orders, which are segregated by the identifying means at the end of each order.

Continuous operation of the system includes monitoring the inventory of the items stored in the preselected storage locations, and replenishing the items as required.

BRIEF DESCRIPTION OF THE DRAWINGS

For a better understanding of the present invention, reference is made to the accompanying drawings. The drawings show one embodiment of the invention as presently preferred. However, it should be understood that the invention is not limited to the precise arrangements and instrumentalities shown in the drawings.

DETAILED DESCRIPTION OF THE INVENTION

The present invention relates to a computerized order selection system and a method of operating the system for retrieving multiple types of items stored in preselected storage locations and delivering the retrieved items in an orderly sequence to packing stations in accordance with the specific requirements of different orders. The invention is discussed herein for an application where the retrieved items are entertainment products in different media configurations-compact discs, audiocassettes, videocassettes in sleeve-shaped packages, and videocassettes in clam shell-shaped packages. However, the system is applicable to numerous other types of products or goods, and may be used to handle items other than finished goods. For example, the system could be used to handle work-in-process inventory.

Figure 1:
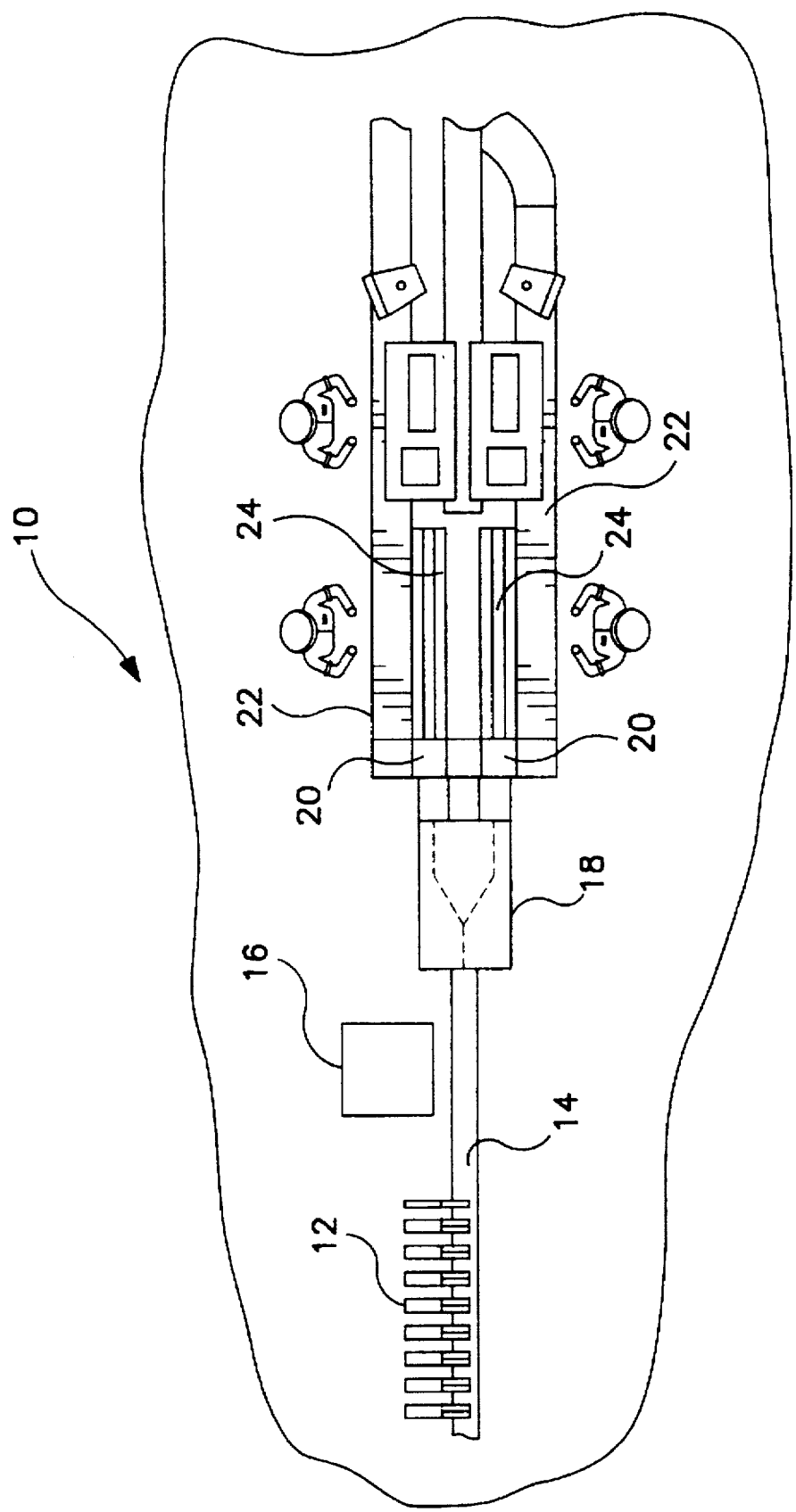
FIG. 1 is a schematic diagram illustrating an order selection system according to the present invention.

Referring to the drawings, where like elements are identified by like numerals, there is shown in FIG. 1 a preferred embodiment of the order selection system 10. The system comprises a dispenser 12, a conveyor 14, a dispensing control system 16, a sorter 18, stacking devices 20, and identifying means to identify the end of each order. In the illustrated embodiment, the system includes two packing stations 22. However, as indicated below and in the claims, variations of the system may include three or more packing stations 22.

The dispenser 12, which is a module comprising an array of dispensing mechanisms, is arranged to engage and selectively dispense the items stored in the preselected storage locations. The dispensed items are received on the conveyor 14, which transports the dispensed items toward the packing stations 22.

The dispensing control system (DCS) 16 controls the dispenser 12 to selectively dispense desired items from the preselected storage locations in a fashion such that the items are dispensed onto the conveyor 14 in a "rotating sequence" in accordance with the requirements of a designated number of sequential orders being picked or selected concurrently. The "rotating sequence" is determined by the preselected number of sequential orders being picked or selected concurrently. If, as in the illustrated embodiment, there are two sequential orders (e.g., Order "A1" and Order "B1") being picked or selected concurrently, then the items are dispensed in an alternating fashion, such as $A1_1$, $B1_1$, $A1_2$, $B1_2$ etc. (where $A1_1$ and $A1_2$ are items required to fill Order A1 and where $B1_1$ and $B1_2$ are items required to fill Order B1). If there are three sequential orders (e.g., Order "A1", Order "B1", and Order "C1") being picked or selected concurrently, then the items are dispensed in the following "rotating sequence"—$A1_1$, $B1_1$, $C1_1$, $A1_2$, $B1_2$, $C1_2$, etc. (where $C1_1$ and $C1_2$ are items required to fill Order C1).

The sorter 18 is disposed between the conveyor 14 and the packing stations 22. The sorter 18 sorts the items being transported toward the packing stations 22 so as to divert specific items toward specific packing stations in accordance with the requirements of the orders.

When the designated number of sequential orders being picked or selected concurrently is (n+1) where n is an integer greater than zero, the sorter 18 diverts every (n+1)th item toward a separate packing station 22. For example, when the designated number of sequential orders being picked or selected concurrently is three (i.e., n=2), every third item is diverted toward a separate packing station 22. When the designated number of sequential orders being picked or selected concurrently is four (i.e., n=3), every fourth item is diverted toward a separate packing station 22. As "n" increases, operation of the sorter 18 is as follows:

| n | Designated Number of Sequential Orders Being Picked Concurrently (n + 1) | Operation of Sorter 18 |
|---|---|---|
| 4 | 5 | every 5th item diverted |
| 5 | 6 | every 6th item diverted |
| 6 | 7 | every 7th item diverted |
| 7 | 8 | every 8th item diverted |
| 8 | 9 | every 9th item diverted |
| 9 | 10 | every 10th item diverted |
| 10 | 11 | every 11th item diverted |
| . | . | . |
| . | . | . |
| n | (n + 1) | every (n + 1)th item diverted |

The stacking devices 20 are located between the sorter 18 and the packing stations 22. The stacking devices 20 stack the items into discrete continuous stacks or "loaves" conforming with the specific requirements of the orders.

In the illustrated embodiment, the invention is used as an order selection system for filling orders for newly-released entertainment products in four media configurations-compact disks, audiocassettes, and videocassettes packaged in sleeves and clam shells. Persons skilled in the art will recognize that the dispenser 12 may be one of several dispensing devices widely known in the industry. Two such devices are disclosed in the patents previously discussed, U.S. Pat. Nos. 4,501,528 (Knapp) and 5,271,703 (Lindqvist et al.).

In the illustrated embodiment, the dispenser 12 is a one-sided "T" frame module with 122 channels and media dispenser mechanisms manufactured by Knapp. The dispenser mechanisms are mounted vertically onto two extruded aluminum rails situated directly over the conveyor 14. The conveyor 14 receives products from the dispenser 12 and transports the products to the packing stations 22.

A high-speed sorter 18 separates a single file stream of products, moving at the rate of 150 units per minute, into two streams of 75 units per minute. Two conveyor belts reorient and align the products while insuring a uniform rate into the stacking devices 20.

The two stacking devices 20 process all four media configurations. These devices 20 create a continuous, horizontal "loaf" of product and push the loaf to the packing personnel via roller chains 24. Each packing station 22 is complete with a terminal, bar code scanner, invoice printer, and shipping label printer.

Figure 2:
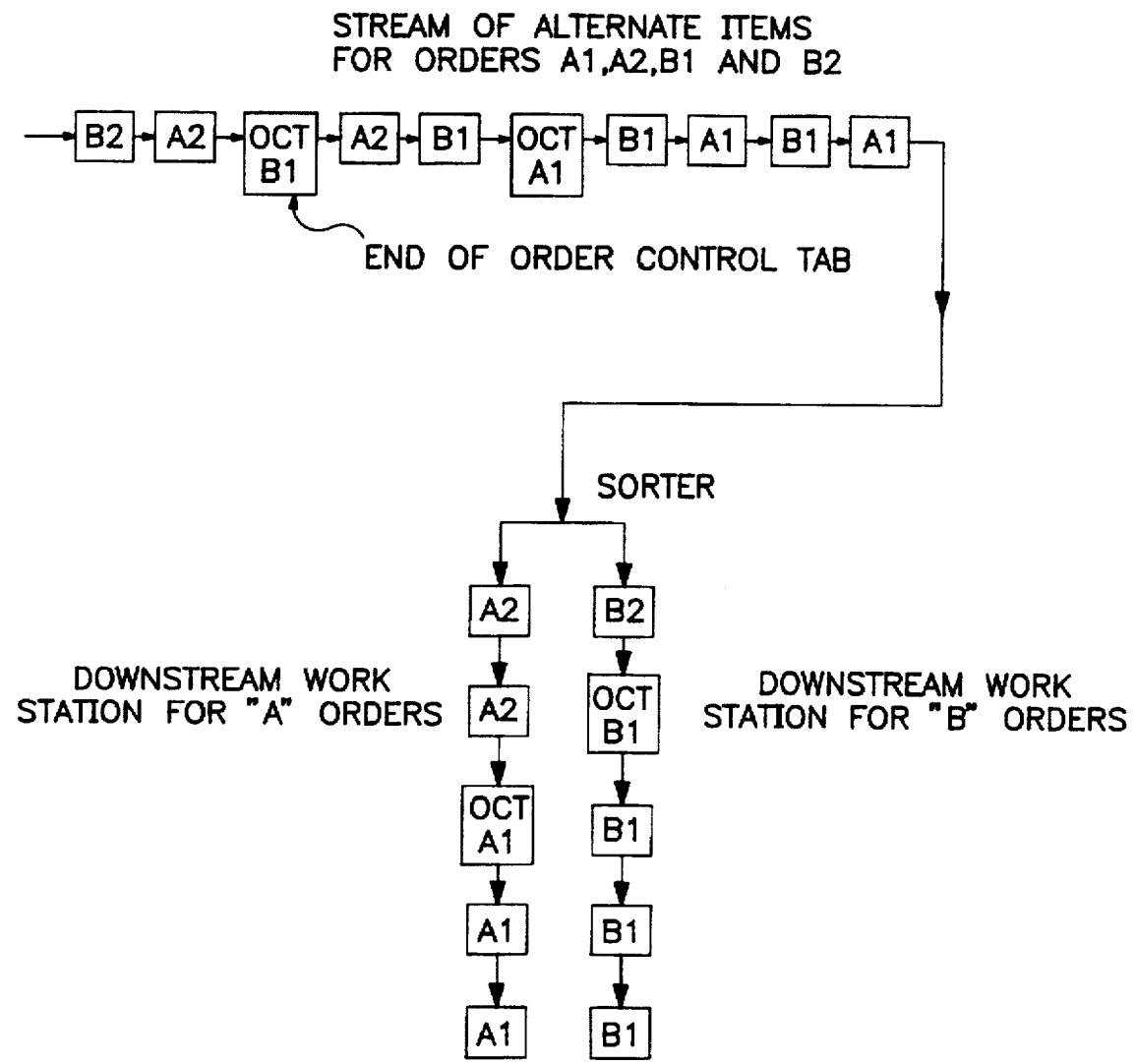
FIG. 2 is a flow diagram for such a system, showing the alternate sequence of dispensing and subsequent sorting.

FIG. 2 is a flow diagram of the system with two packing lines for a case where the "designated number of sequential orders being picked or selected concurrently" is two. Two orders are concurrently picked or selected in an alternating fashion, one item for each order, and the selected items are dispensed onto the conveyor 14. This process continues until all of the orders for the run are picked. Thus, a steady stream of orders will be coming from the dispenser 12. An end of order identifier in the form of an order control tag (OCT) is added to the end of each order to assist downstream packing operators in the identification of the end of each order.

As the order stream approaches the packing stations 22, items which make up the orders are sorted to one of two packing lines by diverting every other item onto a separate packing station conveyor. Thus, each of the two packing operators are presented with a steady stream of orders at the same time. As shown in FIG. 2, the operators at one station receive all of the "A" orders, and the operators at the other station receive all of the "B" orders.

Figure 3A:
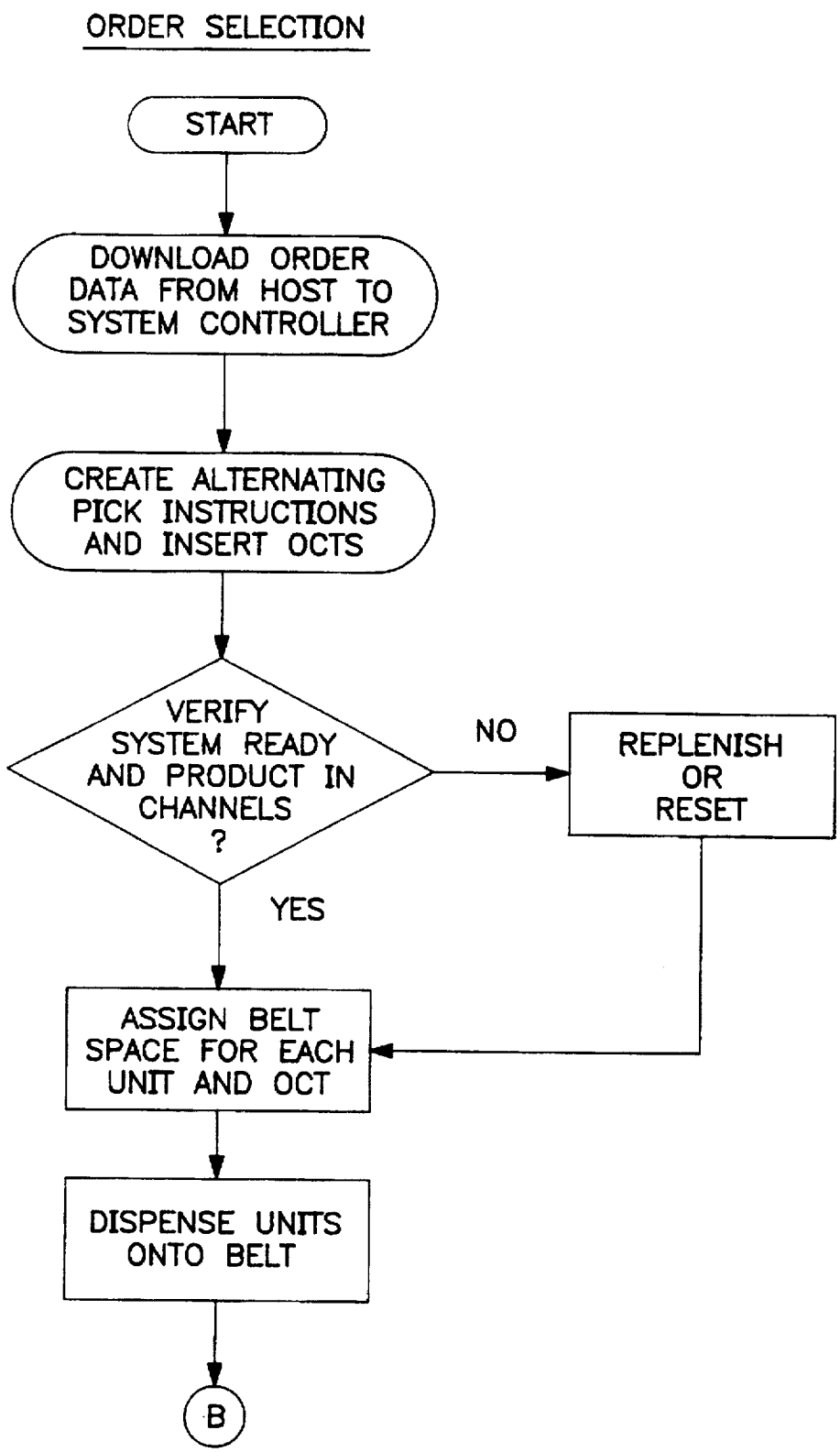
FIG. 3 is composed of parts 3A, 3B and 3C which, in total, comprise a flow chart for the operation of the present invention.
Figure 3B:
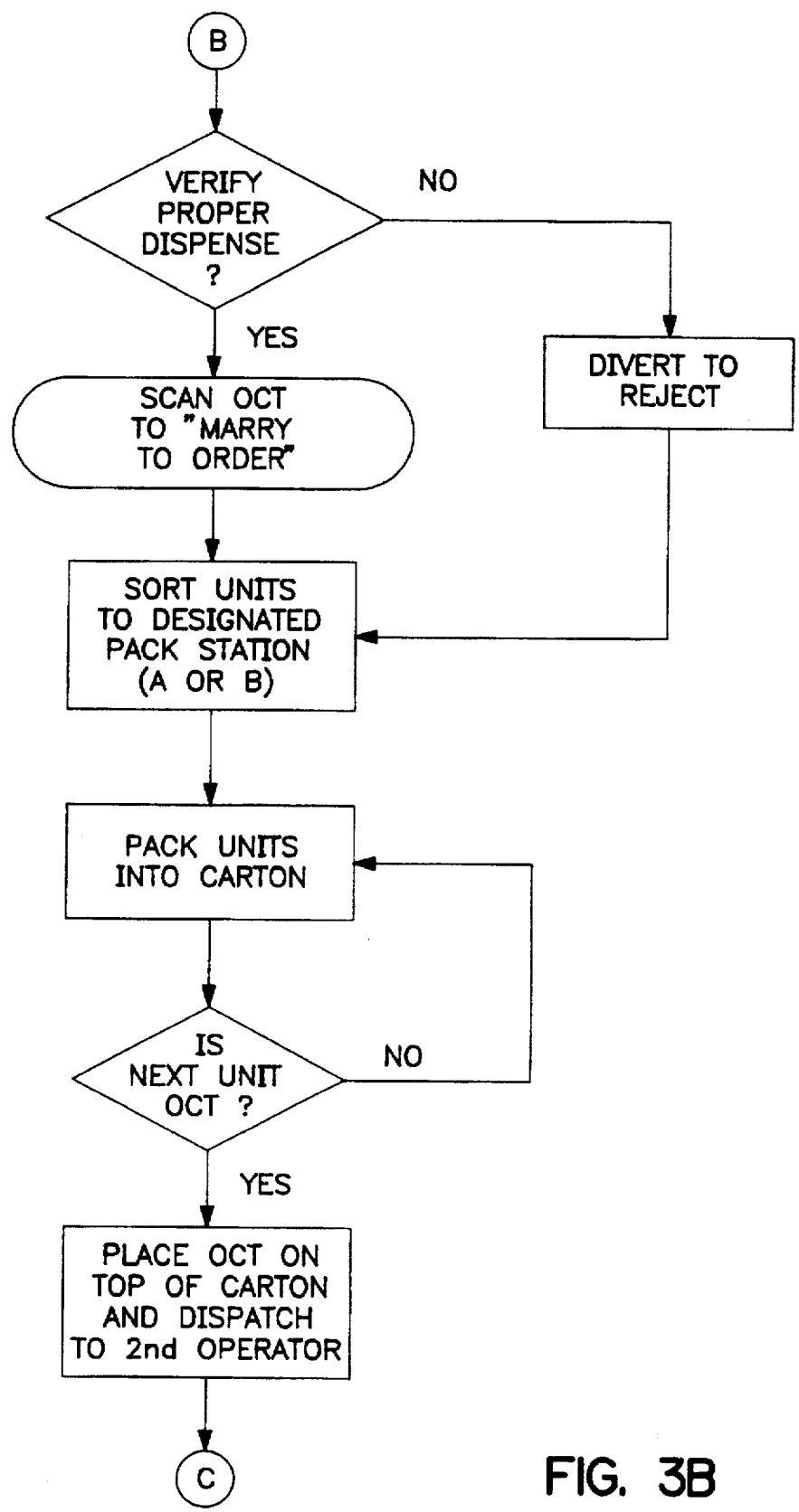
Figure 3C:
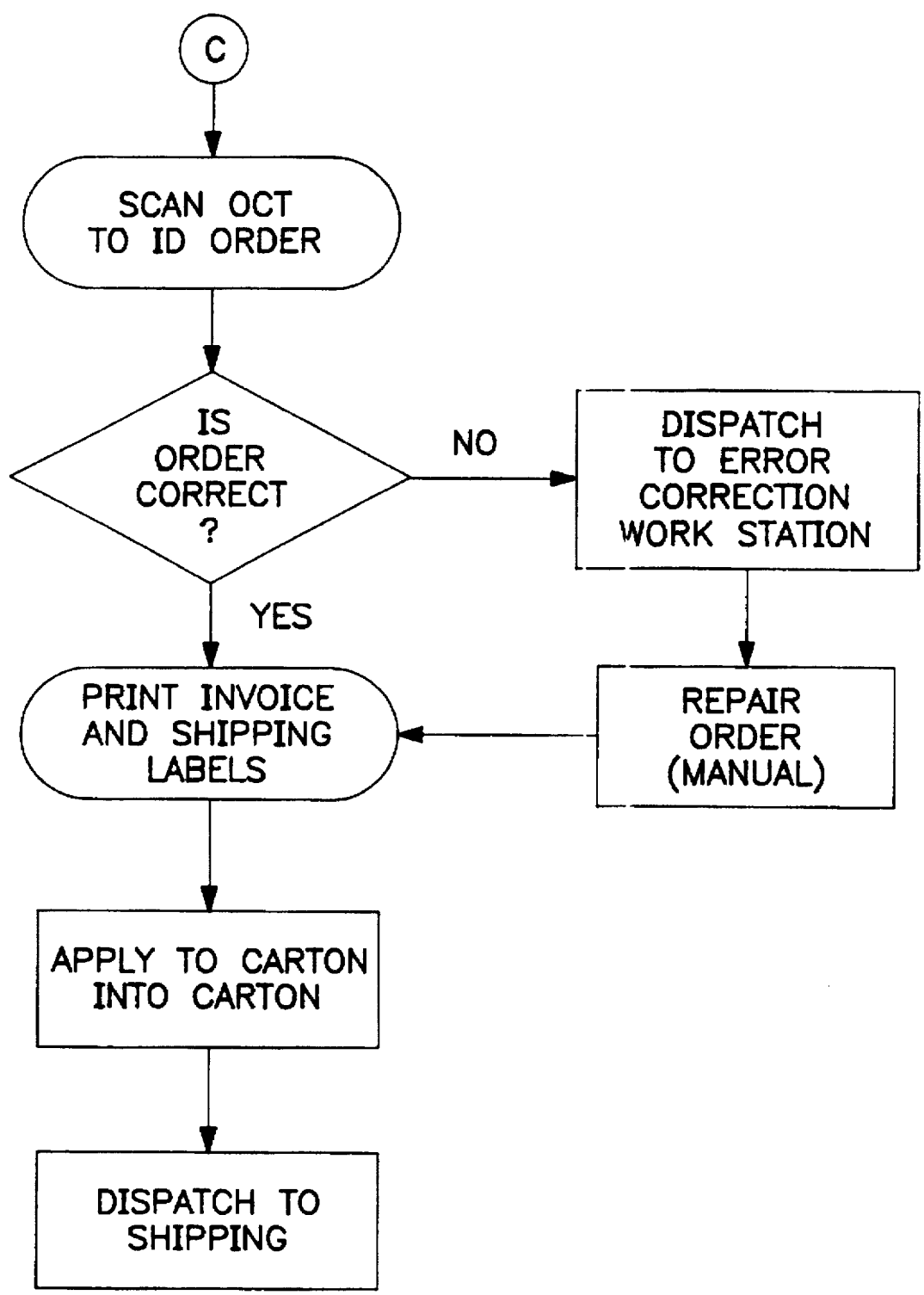

FIG. 3, which is composed of parts 3A, 3B and 3C, is a flow chart illustrating various events, processing tasks, and decisional choices for one method of operating the present invention. Persons skilled in the art will recognize that there may be different methods of operation which do not depart from the spirit and scope of the invention as defined in the claims.

In one embodiment of a method of operating the system, order information is assembled by a host computer and downloaded to the DCS 16. The DCS 16 places the orders into an order file. The file is passed to an order "parsing" routine which reads the order file, selects, and formats the data for import into the order database. The parsing routine separates the data into picking instructions, shipping label data, and manifesting data. This data is accessed during the picking and packing operations.

The DCS 16 typically processes orders in a first-in-first-out (FIFO) sequence unless the order file contains wave or batch processing indicators. The system operator initiates order processing by selecting the "start picking" function on the operator "pick menu" of the DCS 16. As long as there are orders in the order database, the system picks and delivers orders to the packing stations 22. Each order stream includes, as a trailer, an end of order control tag (OCT). This device may be, for example, a brightly colored "puck" with a unique bar code identifier that designates order boundaries to the pack station operators.

Each item needed for an order is automatically dispensed from an appropriate channel of the dispenser 12 and deposited onto the moving conveyor 14. The DCS utilizes an encoder to constantly track the conveyor 14 and assign a "time window" to each item picked. With a conveyor speed of about 180 feet per minute, each item is allotted about 15 inches of conveyor 14, whether it is a compact disc, audiocassette, or videocassette. As the assigned window for an item passes the appropriate channel of the dispenser 12, the dispenser 12 places an item onto the assigned space in a flat orientation.

The system selects two orders at a time and alternately dispenses one item for each order onto the moving conveyor 14, which results in dynamic load balancing by interweaving orders for later separation. The DCS 16 automatically adds an OCT to the end of each order stream. As the OCT exits the area of the dispenser 12, a scanner reads the code to "marry" it to the order.

As the stream of retrieved items moves toward the packing stations 22, the items are sorted to the appropriate orders via a sorter 18, which in the preferred embodiment is a magnetic line divider. The sorter 18 deposits every other item onto one of two conveyor belts.

The two streams of items are delivered to high-speed stacking devices or "loafers" 20. As the items travel over the head pulley of the conveyor, they are indexed into a pocket, one of fourteen (14) on a starwheel. The pocket is sized to accommodate the largest item, which in this case is a videocassette in a clam shell package. Upon reaching the bottom of the pocket, the starwheel rotates through about 25.7 degrees. This operation continues to push a continuous loaf of items onto a set of low-friction roller chains 24 that deliver the loaf to the packing operators.

The packing area is configured to minimize the effect of varying order sizes while maximizing throughput. The area has two distinct packing stations 22, each staffed by two packers. The design provides a low cost, high-speed method of delivering "continuous loaves" of items to the packers. The continuous nature of the process ensures that packers are never "starved" of items to be packed, since every other item picked is for a different packing station 22. Therefore, large and small orders can be processed simultaneously without the need for excessively large buffer areas and without overwhelming a particular packing station 22.

The continuous roller chains 24 allow each operator to grasp the quantity of product that they can comfortably grip with their hands. In addition to the ergonomic advantages of this design, productivity is improved by the "team" concept, since operators working as a team normally outperform individuals. Operators can alternate tasks, which will minimize the fatigue that leads to errors.

In the embodiment discussed above, the roller chains 24 are at an elevation of approximately 44 inches. The packing tables are located directly adjacent to, and slightly below (roughly 28–30 inches) the roller chains 24. This allows operators to remove product from the roller chains 24 (in whatever quantity they can comfortably grip) and place the items into a shipping container with a lowering motion. When a carton is full, the first operator passes a carton to the second operator. When the end of an order is reached, the OCT is placed inside the last cannon (on top) to indicate the end of the order to the second operator.

The second operator scans the bar code on the OCT to verify order sequence. This initiates printing of the invoice and ship label. The invoice is inserted into the cannon, the ship label affixed, and the carton dispatched to shipping.

The packing tables are constructed with gravity roller conveyors to facilitate passing the cartons, and to provide some buffer between the two portions of the operation. The layout allows a "common" takeaway conveyor to be installed between the two pack areas.

If an order is short, the DCS 16 alerts the operator and will indicate if the order is to be shipped short. If the operator (or the system) elects to ship the order short, the manifest document will reflect the short items. If the operator decides to complete the order, the operator will place the order carton aside to be corrected.

The channels of the dispenser 12 may be replenished as needed, while the system is running. Transparent display mounts that hold the items to be dispensed provide easy identification of which items are in which channels. Operating personnel may be used to continuously monitor and replenish the channels of the dispenser 12. Other more complex "directed" replenishing methods also may be used. Approximately three personnel (each replenishing at 3,000 pieces per hour) can perform the replenishment function in a typical system.

The present invention may be embodied in other variant forms where the variation does not substantially differentiate from the essential novelty and uniqueness revealed in the foregoing disclosure. Reference should therefore be made to the appended claims rather than the foregoing specification, as indicating the scope of the invention. It should be understood that many modifications, variations and changes may be made without departing from the spirit and scope of the invention as defined in the claims.

What is claimed is:

1. An order selection system for retrieving multiple types of items stored in preselected storage locations and delivering retrieved items in an orderly sequence to a plurality of packing stations in accordance with the specific requirements of different orders, said system comprising:

at least one dispenser, arranged to engage items stored in the preselected storage locations, for selectively dispensing the items;

at least one conveyor for receiving items dispensed by said at least one dispenser and for transporting dispensed items toward the packing stations;

a dispensing control system for controlling said at least one dispenser to selectively dispense desired items from the preselected storage locations in an alternating fashion such that the items are dispensed onto said at least one conveyor in an alternating order sequence in accordance with the requirements of sequential orders;

at least one sorter, disposed between said at least one conveyor and the packing stations, for alternately sorting the items being transported toward the packing stations so as to divert every other item toward separate packing stations;

a plurality of stacking devices, disposed between said at least one sorter and the packing stations, for stacking the sorted items into discrete continuous stacks conforming with the specific requirements of the orders; and identifying means to identify the end of each order.

2. An order selection system as in claim 1, further comprising:

monitoring means to monitor the inventory of the items stored in the preselected storage locations; and replenishing means to replenish the items stored in the preselected storage locations.

3. An order selection system as in claim 1, wherein said at least one sorter is a magnetic line divider.

4. A method of operating an order selection system for retrieving multiple types of items stored in preselected storage locations and delivering retrieved items in an orderly sequence to a plurality of packing stations in accordance with the specific requirements of different orders, comprising the steps of:

arranging the multiple types of items in the preselected storage locations;

providing at least one dispenser, arranged to engage items stored in preselected storage locations, for selectively dispensing the items;

providing at least one conveyor for receiving items dispensed by said at least one dispenser and for transporting dispensed items toward the packing stations;

determining the requirements of orders to be filled;

providing a dispensing control system for controlling said at least one dispenser to selectively dispense desired items from the preselected storage locations in an alternating fashion such that the items are dispensed onto said at least one conveyor in an alternating order sequence in accordance with the requirements of sequential orders;

dispensing the items stored in the preselected storage locations in an alternating order sequence in accordance with the requirements of sequential orders;

receiving the dispensed items on the at least one conveyor in said alternating order sequence in accordance with the requirements of sequential orders;

transporting dispensed items on the at least one conveyor toward the packing stations;

providing at least one sorter, disposed between said at least one conveyor and the packing stations, for alternately sorting the items being transported toward the packing stations so as to divert every other item toward separate packing stations;

sorting the items being transported toward the packing stations so as to divert every other item toward separate packing stations;

providing a plurality of stacking devices, disposed between said at least one sorter and the packing stations, for stacking the sorted items into discrete continuous stacks conforming with the specific requirements of the orders;

stacking the sorted items into discrete continuous stacks conforming with the specific requirements of the orders; and identifying the end of each order.

5. A method of operating an order selection system as in claim 4, further comprising the steps of:

monitoring the inventory of the items stored in the preselected storage locations; and replenishing the items stored in the preselected storage locations.

6. A method of operating an order selection system for retrieving multiple types of items stored in preselected storage locations and delivering retrieved items in an orderly sequence to a plurality of packing stations in accordance with the specific requirements of different orders, comprising the steps of:

arranging the multiple types of items in the preselected storage locations;

determining the requirements of orders to be filled;

dispensing the items stored in the preselected storage locations in an alternating order sequence in accordance with the requirements of sequential orders;

receiving the dispensed items on the at least one conveyor in said alternating order sequence in accordance with the requirements of sequential orders;

transporting dispensed items on the at least one conveyor toward the packing stations;

sorting the items being transported so as to divert every other item toward separate packing stations;

stacking the sorted items into discrete continuous stacks conforming with the specific requirements of the orders; and identifying the end of each order.

7. A method of operating an order selection system as in claim 6, further comprising the steps of:

monitoring the inventory of the items stored in the preselected storage locations; and replenishing the items stored in the preselected storage locations.

8. The method of claim 6, wherein said step of sorting is carried out with a magnetic line divider.

9. An order selection system for retrieving multiple types of items stored in preselected storage locations and delivering retrieved items in an orderly sequence to a plurality of packing stations in accordance with the specific requirements of different orders, said system comprising:

at least one dispenser, arranged to engage items stored in the preselected storage locations, for selectively dispensing the items;

at least one conveyor for receiving items dispensed by said at least one dispenser and for transporting dispensed items toward the packing stations;

a dispensing control system for controlling said at least one dispenser to selectively dispense desired items from the preselected storage locations onto said at least one conveyor in a rotating sequence in accordance with the requirements of a preselected number of orders equal to the number of packing stations;

at least one sorter, disposed between said at least one conveyor and the packing stations, for sorting the items being transported toward the packing stations so as to divert items in said rotating sequence toward corresponding packing stations in said rotating sequence;

a plurality of stacking devices, disposed between said at least one sorter and the packing stations, for stacking the sorted items into discrete continuous stacks conforming with the specific requirements of the orders; and identifying means to identify the end of each order.

10. An order selection system as in claim 9, further comprising:

monitoring means to monitor the inventory of the items stored in the preselected storage locations; and replenishing means to replenish the items stored in the preselected storage locations.

11. A method of operating an order selection system for retrieving multiple types of items stored in preselected storage locations and delivering retrieved items in an orderly sequence to a plurality of packing stations in accordance with the specific requirements of different orders, comprising the steps of:

arranging the multiple types of items in the preselected storage locations;

providing at least one dispenser, arranged to engage items stored in preselected storage locations, for selectively dispensing the items;

providing at least one conveyor for receiving items dispensed by said at least one dispenser and for transporting dispensed items toward the packing stations;

determining the requirements of orders to be filled;

providing a dispensing control system for controlling said at least one dispenser to selectively dispense desired items from the preselected storage locations onto said at least one conveyor in a rotating sequence in accordance with the requirements of a preselected number of orders equal to the number of packing stations;

dispensing the items stored in the preselected storage locations in a rotating sequence in accordance with the requirements of a preselected number of orders equal to the number of packing stations;

receiving the dispensed items on the at least one conveyor in said rotating sequence in accordance with the requirements of a preselected number of orders equal to the number of packing stations;

transporting dispensed items on the at least one conveyor toward the packing stations;

providing at least one sorter, disposed between said at least one conveyor and the packing stations, for sorting the items being transported toward the packing stations so as to divert items in said rotating sequence toward corresponding packing stations in said rotating sequence;

sorting the items being transported toward the packing stations so as to divert items in said rotating sequence toward corresponding packing stations in said rotating sequence;

providing a plurality of stacking devices, disposed between said at least one sorter and the packing stations, for stacking the sorted items into discrete continuous stacks conforming with the specific requirements of the orders;

stacking the sorted items into discrete continuous stacks conforming with the specific requirements of the orders; and identifying the end of each order.

12. A method of operating an order selection system as in claim 11, further comprising the steps of:

monitoring the inventory of the items stored in the preselected storage locations; and replenishing the items stored in the preselected storage locations.

13. A method of operating an order selection system for retrieving multiple types of items stored in preselected storage locations and delivering retrieved items in an orderly sequence to a plurality of packing stations in accordance with the specific requirements of different orders, comprising the steps of:

arranging the multiple types of items in the preselected storage locations;

determining the requirements of orders to be filled;

dispensing the items stored in the preselected storage locations in a rotating sequence in accordance with the requirements of a preselected number of orders equal to the number of packing stations;

receiving the dispensed items on at the least one conveyor in said rotating sequence in accordance with the requirements of a preselected number of orders equal to the number of packing stations;

transporting dispensed items on the at least one conveyor toward the packing stations;

sorting the items being transported so as to divert items in said rotating sequence toward corresponding packing stations in said rotating sequence;

stacking the sorted items into discrete continuous stacks conforming with the specific requirements of the orders; and identifying the end of each order.

14. A method of operating an order selection system as in claim 13, further comprising the steps of:

monitoring the inventory of the items stored in the preselected storage locations; and replenishing the items stored in the preselected storage locations.

15. An order selection system for retrieving multiple types of items stored in preselected storage locations and delivering retrieved items in an orderly sequence to a plurality of packing stations in accordance with the specific requirements of different orders, said system comprising:

at least one dispenser, arranged to engage items stored in the preselected storage locations, for selectively dispensing the items;

at least one conveyor for receiving items dispensed by said at least one dispenser and for transporting dispensed items toward the packing stations;

a dispensing control system for controlling said at least one dispenser to selectively dispense desired items from the preselected storage locations onto said at least one conveyor in a rotating sequence in accordance with the requirements of (n+1) sequential orders, where n is an integer greater than zero;

at least one sorter, disposed between said at least one conveyor and the packing stations, for sorting the items being transported toward the packing stations so as to divert every (n+1)th item toward corresponding packing stations in said rotating sequence;

a plurality of stacking devices, disposed between said at least one sorter and the packing stations, for stacking the sorted items into discrete continuous stacks conforming with the specific requirements of the orders; and identifying means to identify the end of each order.

16. An order selection system as in claim 15, further comprising:

monitoring means to monitor the inventory of the items stored in the preselected storage locations; and replenishing means to replenish the items stored in the preselected storage locations.

17. A method of operating an order selection system for retrieving multiple types of items stored in preselected storage locations and delivering retrieved items in an orderly sequence to a plurality of packing stations in accordance with the specific requirements of different orders, comprising the steps of:

arranging the multiple types of items in the preselected storage locations;

providing at least one dispenser, arranged to engage items stored in preselected storage locations, for selectively dispensing the items;

providing at least one conveyor for receiving items dispensed by said at least one dispenser and for transporting dispensed items toward the packing stations;

determining the requirements of orders to be filled;

providing a dispensing control system for controlling said at least one dispenser to selectively dispense desired items from the preselected storage locations onto said at least one conveyor in a rotating sequence in accordance with the requirements of (n+1) sequential orders, where n is an integer greater than zero;

dispensing the items stored in the preselected storage locations in a rotating sequence in accordance with the requirements of (n+1) sequential orders;

receiving the dispensed items on the at least one conveyor in said rotating sequence in accordance with the requirements of (n+1) sequential orders;

transporting dispensed items on the at least one conveyor toward the packing stations;

providing at least one sorter, disposed between said at least one conveyor and the packing stations, for sorting the items being transported toward the packing stations so as to divert every (n+1)th item toward corresponding packing stations in said rotating sequence;

sorting the items being transported toward the packing stations so as to divert every (n+1)th item toward corresponding packing stations in said rotating sequence;

providing a plurality of stacking devices, disposed between said at least one sorter and the packing stations, for stacking the sorted items into discrete continuous stacks conforming with the specific requirements of the orders;

stacking the sorted items into discrete continuous stacks conforming with the specific requirements of the orders; and identifying the end of each order.

18. A method of operating an order selection system as in claim 17, further comprising the steps of:

monitoring the inventory of the items stored in the preselected storage locations; and replenishing the items stored in the preselected storage locations.

19. A method of operating an order selection system for retrieving multiple types of items stored in preselected storage locations and delivering retrieved items in an orderly sequence to a plurality of packing stations in accordance with the specific requirements of different orders, comprising the steps of:

arranging the multiple types of items in the preselected storage locations;

determining the requirements of orders to be filled;

dispensing the items stored in the preselected storage locations in a rotating sequence in accordance with the requirements of (n+1) sequential orders, wherein n is an integer greater than zero;

receiving the dispensed items on the at least one conveyor in said rotating sequence in accordance with the requirements of (n+1) sequential orders;

transporting dispensed items on the at least one conveyor toward the packing stations;

sorting the items being transported so as to divert every (n+1)th item toward corresponding packing stations in said rotating sequence;

stacking the sorted items into discrete continuous stacks conforming with the specific requirements of the orders; and identifying the end of each order.

20. A method of operating an order selection system as in claim 19, further comprising the steps of:

monitoring the inventory of the items stored in the preselected storage locations; and replenishing the items stored in the preselected storage locations.

* * * * *